April 7, 1936. J. ROBINSON 2,036,299
TREATMENT OF PETROLEUM SLUDGES AND SLUDGE ACIDS
Filed June 30, 1932
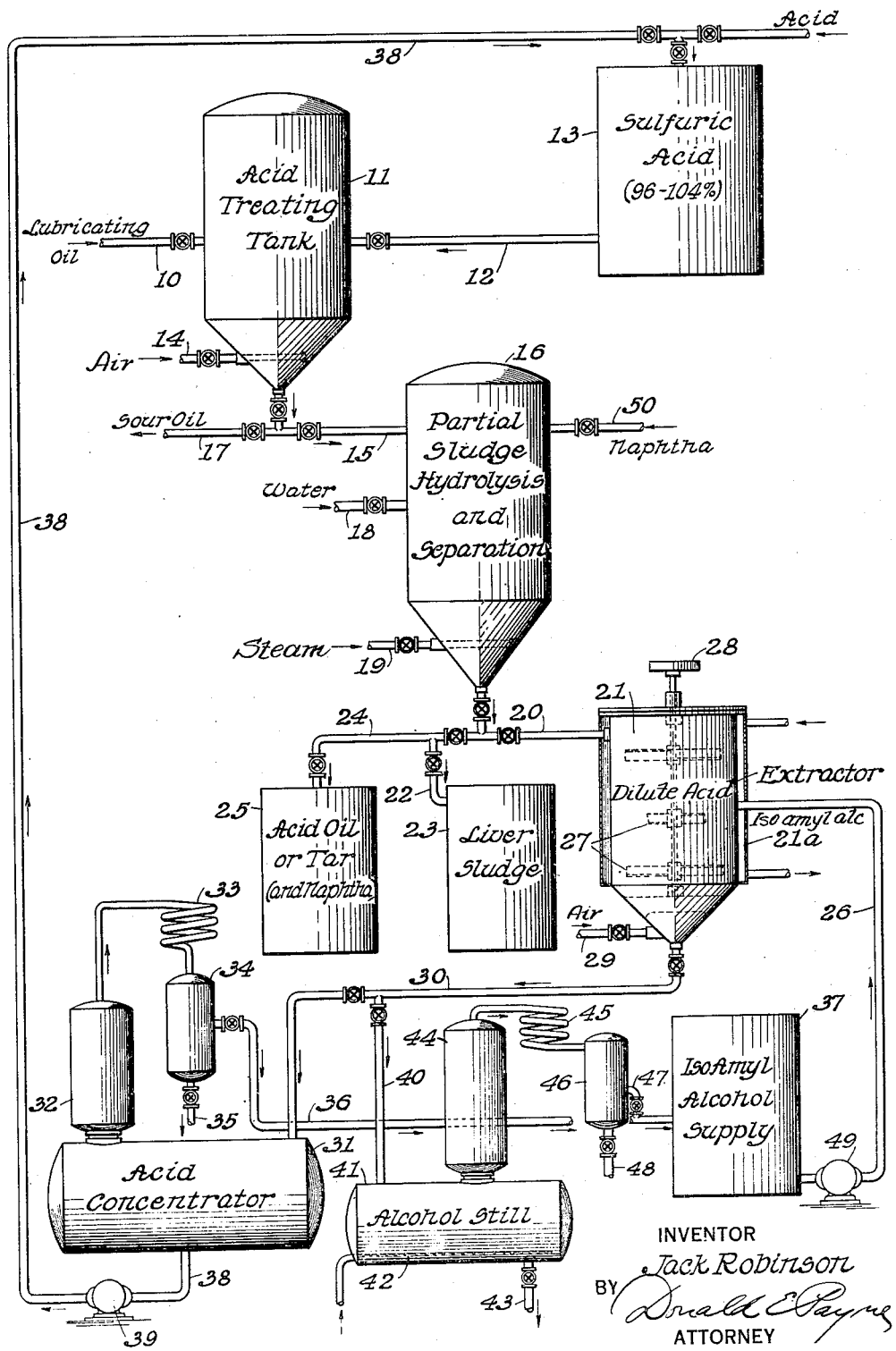
INVENTOR
Jack Robinson
BY
ATTORNEY Patented Apr. 7, 1936

2,036,299

UNITED STATES PATENT OFFICE 2,036,299

TREATMENT OF PETROLEUM SLUDGES AND SLUDGE ACIDS

Jack Robinson, Wood River, Ill., assignor to Standard Oil Company, Chicago, Ill., a corporation of Indiana Application June 30, 1932, Serial No. 620,188

3 Claims. (Cl. 23—173)

This invention relates to the treatment of petroleum sludges and sludge acids and it pertains more particularly to the breaking of emulsions and the separation of organic material from dilute sludge acids.

In the refining of petroleum lubricating oils with sulfuric acid, petroleum sludges are formed. These sludges are partially hydrolized and separated into three layers: A dilute acid layer; a middle sludge or "liver" layer, and an upper acid tar layer. The dilute acid layer is concentrated and re-used for the treatment of more oil. The readiness with which sulfuric acid may be separated and re-concentrated depends largely on the nature of the treating operation in which it is employed. In the treatment of viscous lubricating oil with fuming acid, the recovery is particularly difficult because of the formation of sulfonated bodies having a high solubility in sulfuric acid and water.

Dilute sludge acid is often characterized by the presence of emulsions which are very difficult to break; also the dilute acid may contain large amounts of organic matter which makes the subsequent concentration thereof very difficult and often impossible. I have discovered that the amount of organic matter retained in the acid layer increases considerably with increase in dilution beyond a certain point, and the carbon content of the weak acid can be greatly reduced if it is not too greatly diluted by water or steam in the hydrolysis of the sludge. In other words, by limiting the amount of added water and steam to give a dilute acid of about 30° to 35° Bé. I eliminate a large amount of carbonaceous impurities which would accumulate in the dilute acid layer if it were diluted, as in conventional refinery practice to 26° Bé.

However the acid will still contain a considerable amount of organic impurities either dissolved or in the form of suspensions or emulsions. An object of my invention is to provide a means for breaking these emulsions and for removing these organic impurities from the dilute acid so that it may be more easily concentrated and re-used in the system. I have discovered that the higher alcohols, such as iso-amyl alcohol, effectively break these emulsions and remove the organic impurities from the acid into the alcoholic phase which usually forms a separate upper layer. By using about one part of iso-amyl alcohol with nine parts of 30° to 35° Bé. acid, I obtain a sharp separation of phases and I find that the carbonaceous organic impurities are effectively separated and accumulated in the upper phase. The invention will be more clearly understood from the following description and from the accompanying drawing which forms a part of this specification and in which I have shown a diagrammatical elevation of my apparatus.

I will describe the invention as applied to treatment of sludge and sludge acid from the production of Mid-Continent lubricating oil of intermediate viscosity, but it should be understood that the invention is applicable to treatment of sludge from any petroleum oil, particularly viscous lubricating oils and oils used for the production of so-called white oils and medicinal oils.

The amount and strength of acid used to treat the oil will depend upon the particular oil undergoing treatment and the degree of purification which is required. Usually the acid is about from 93% to 104% and it is applied in amounts of from ½ to 8 pounds per gallon; a preferred example is two pounds of 104.5% acid per gallon of oil.

The oil which may suitably be a Mid-Continent distillate having a viscosity of approximately 120 seconds Saybolt at 210° F., is introduced by pipe 10 into acid treating tank 11, wherein it is mixed with the acid introduced by pipe 12 from acid storage tank 13. Agitation is effected by blowing with air introduced by pipe 14. After a thorough agitation the mixture is allowed to settle, the sludge being withdrawn through pipe 15 to a second agitator 16 and the sour oil being drawn through pipe 17 for neutralization and/or contact with clay. The acid may, of course, be applied in successive dumps in which case the sludge will be withdrawn after each dump and collected in agitator 16.

In agitator 16 water and/or steam may be introduced through pipe 18 and the sludge may be agitated and hydrolized by the steam introduced at the base of the agitator through pipe 19. In practicing my invention I limit the amount of steam and water which is added so that the finished dilute acid will have a gravity of about 30° to 35° Bé.; in other words, I maintain the concentration of at least 35% to 40% of sulfuric acid. After the partially hydrolized sludge has been allowed to settle for several hours, the weak acid is withdrawn through pipe 20 to a third agitator 21, the intermediate sludge or "liver" layer is withdrawn by pipe 22 into storage tank 23 and the upper acid oil or acid tar layer is withdrawn by pipe 24 to storage tank 25.

The dilute acid in agitator 21 is preferably cooled to a temperature of 32° F. by means of cooling jacket 21—A. This acid contains sulfuric compounds and undesirable organic and/or carbonaceous materials in solution and suspension, frequently in emulsified form. In order to get rid of these impurities, I add about 10% by volume of a higher alcohol such as isoamyl alcohol through pipe 26 and thoroughly mix the alcohol with the cool dilute acid by means of stirrer 27 operated by a motor or suitable driving means 28. The alcohol is substantially insoluble in the acid and it does not react therewith at relatively low temperatures. A relatively low speed of mixing helps the alcoholic phase to separate from the acid rapidly and thoroughly. Instead of using a mechanical stirrer, I may agitate by blowing an inert gas, such as air, into the bottom of the agitator through pipe 29. The mixture is then allowed to settle, the clean acid going to the bottom and the alcohol together with organic impurities rising to the top.

The acid from the base of agitator 21 is introduced through pipe 30 to acid concentrator 31, which may be lined with glass or with a suitable acid-resisting alloy and which may be heated in any desired manner. Any alcohol which is dissolved or entrained with the acid is removed with the first part of the water,—a sort of steam distillation operation. The combined vapors are passed from concentrator still 31 to reflux tower 32, condenser coils 33 and liquid trap 34, the water being removed from the base of the trap through pipe 35 and the alcohol being returned by pipe 36 to the alcohol supply tank 37. The concentrated acid is returned by pipe 38 and pump 39 to sulfuric acid storage tank 13. It will be understood, of course, that when substantially all of the alcohol has been driven out of the acid in concentrator 31 all of the gases, vapors or condensed products from said concentrator may be passed directly to the sewer through pipe 35.

The alcohol layer from agitator 21 is withdrawn through pipe 40 to alcohol still 41, which is heated by steam coil 42. The oil and organic matter are removed from the base of the still by pipe 43. Vapors pass through reflux tower 44, are condensed in coils 45, and finally separated from water in trap 46, the alcohol passing by pipe 47 to storage tank 37 and the water being discharged through pipe 48. The alcohol is forced by pump 49 from the supply tank 37 to pipe 26 for use in extracting organic impurities from other amounts of dilute acid.

Higher alcohols, such as iso-amyl, have proved to be very useful in breaking petroleum emulsions, particularly acid sludge emulsions which are formed in treating viscous Mid-Continent oils with strong sulfuric acid. In the above example it was pointed out that iso-amyl alcohol broke the oil-in-water emulsions which were present in the dilute acid and thereby facilitated the separation of this acid from organic impurities. In some cases it may be desirable to treat the combined mixture of dilute acid and middle sludge or "liver" with iso-amyl alcohol or the like, so that the "liver" may be utilized. In such cases I introduce the middle sludge or "liver" to agitator 21 along with the dilute acid, and I gently agitate the mixture with about 2% to 20% by volume of said alcohol. Both water-in-oil and oil-in-water emulsions are broken, the oils, organic impurities and alcoholic constituents separating out in the upper layer and the dilute acid separating out in the lower layer. These two layers may then be separately treated as hereinabove described. It will be noted that the alcohol is added to the diluted acid and that here again the temperature is preferably low enough to prevent reaction of the alcohol with the acid.

In practice it is often desirable to add a light hydrocarbon such as naphtha through pipe 50 to the acid sludge prior to or during the hydrolysis thereof. Naphtha aids in removing oily materials, particularly in removing oil soluble sulfonates. It also assists in reducing viscosities and thereby increasing the speed of separation.

As above indicated, the iso-amyl alcohol has the property of breaking water-in-oil emulsions as well as oil-in-water emulsions. Apparently it has the property of lowering the interfacial tension between the oily phase and the aqueous phase. Water-in-oil emulsions may be readily treated by this emulsion-breaker because of its solubility in oil. An example of a water-in-oil emulsion is the sour oil which is removed through pipe 17. This oil contains large amounts of sulfonic compounds which cause the formation of emulsions which are difficult to handle. I have found that about 2% to 5% by volume of a higher alcohol will effectively break these emulsions. The higher alcohols may also be used to break crude emulsions but they are particularly effective in breaking acid sludge emulsions because of their insolubility in dilute acid which facilitates the separation of phases or layers.

The property of breaking sludge emulsions is also shown to a lesser extent by butyl alcohol and particularly normal butyl alcohol. Alcohols heavier than iso-amyl are also very effective when available, examples of these being hexyl, heptyl and octyl alcohols. Aromatic alcohols such as phenol and cresol, and naphthenic alcohols such as cyclohexanol may be used instead of aliphatic alcohols. Also alcohols obtained from unsaturated hydrocarbons by hydrolysis are suitable. These may be obtained from the sulfuric acid sludge produced in the treatment of cracked gasoline, particularly cracked light naphtha. In fact, I may use any alcohol which is substantially insoluble in sulfuric acid and which has the property of preferentially wetting the oily carbonaceous or organic material, thus releasing the acid for concentration and re-use.

The amount of the higher alcohol which is employed for this purpose may vary throughout a relatively wide range but I prefer to use about 2% to 20%, by volume depending upon the nature of the substances to be treated. Emulsions can be readily broken with less than 5% by volume of alcohol but I prefer to use a little more for the purpose of extracting organic carbonaceous impurities.

While I have described in detail a preferred embodiment of my invention, it should be understood that I do not limit myself to any of the above details except as defined by the following claims:

I claim:
1. The method of recovering sludge acid which comprises hydrolyzing acid sludge to yield dilute acid of about 30° to 35° Bé. gravity, admixing a small amount of an aliphatic alcohol having from about 4 to 8 carbon atoms with said dilute acid, maintaining the mixture at a temperature low enough to prevent reaction of the alcohol with the acid, allowing the mixture to separate into an alcohol and an acid phase, separating said phases, and concentrating the acid for reuse.

2. The method of removing carbonaceous organic impurities from dilute sludge acids which comprises the step of admixing them with an aliphatic alcohol having about 4 to 8 carbon atoms, maintaing the mixture at a temperature low enough to prevent reaction of the alcohol with the acids, and removing the alcohol phase whereby the acid may be concentrated in the absence of objectionable organic impurities.

3. The method of breaking an emulsion of a dilute sludge acid and an oily material containing organic matter, which method comprises adding to said emulsion about 2% to 20% of an aliphatic alcohol containing about 4 to 8 carbon atoms, intimately admixing said alcohol with said emulsion, and maintaining the mixture at a low enough temperature to prevent reaction between the acid and the alcohol.

JACK ROBINSON.